March 15, 1966     W. A. BOTTOMS     3,239,900
CHOKER HOOK
Filed Jan. 6, 1964     3 Sheets-Sheet 1
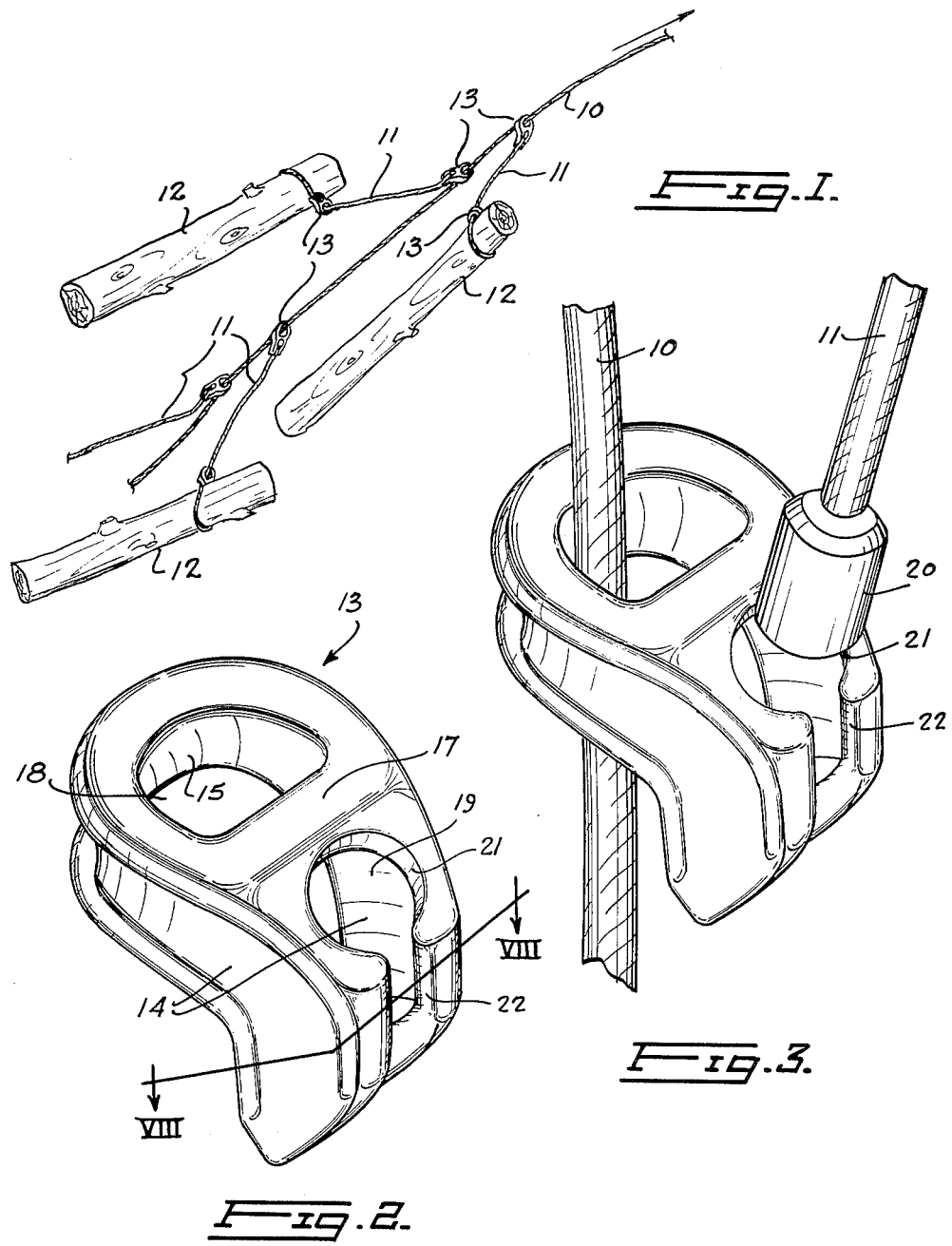

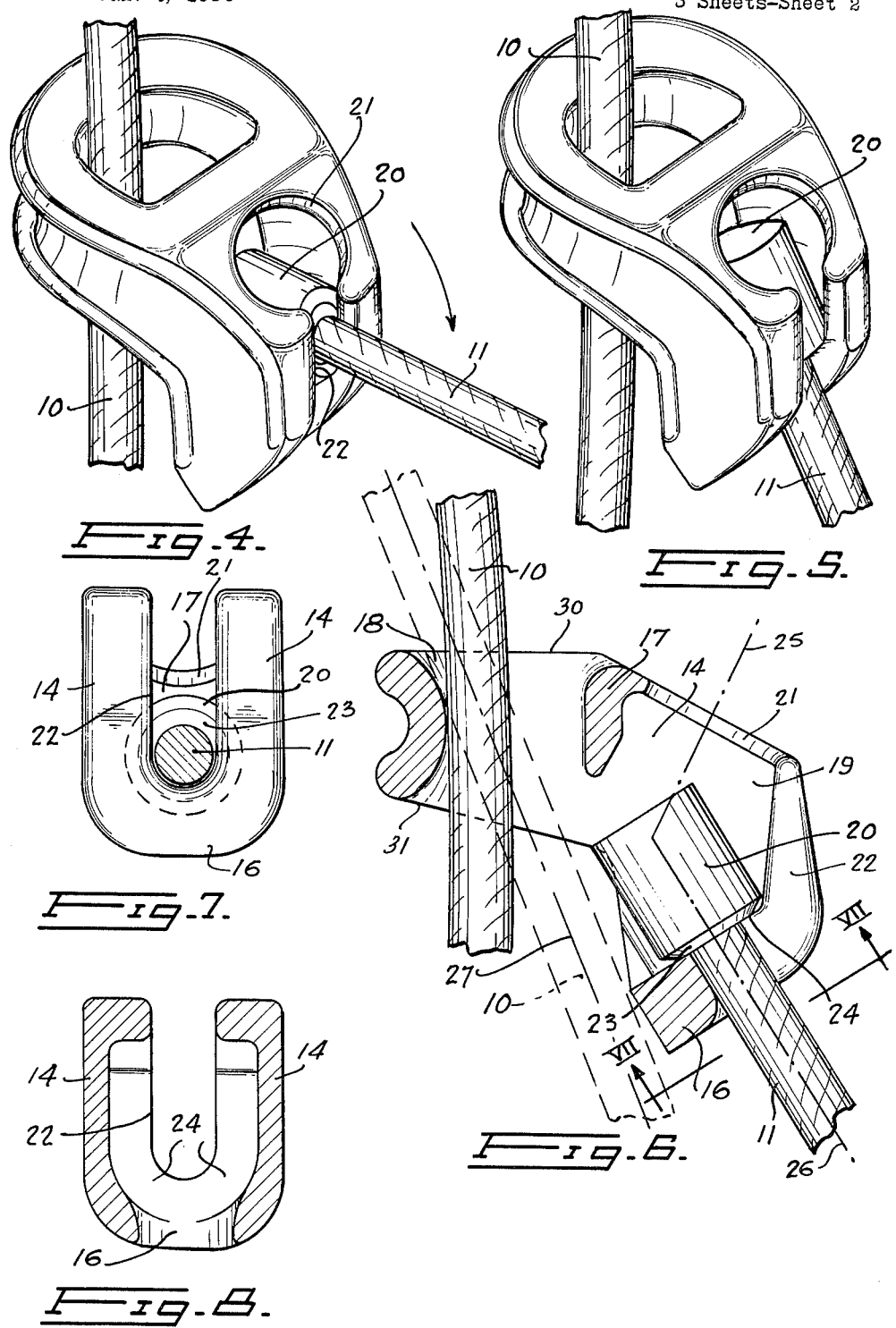

March 15, 1966  W. A. BOTTOMS  3,239,900
CHOKER HOOK

Filed Jan. 6, 1964  3 Sheets-Sheet 3

United States Patent Office 3,239,900
Patented Mar. 15, 1966

3,239,900
CHOKER HOOK
William A. Bottoms, Woodstock, Ontario, Canada, assignor to Timberland-Ellicott Limited, Woodstock, Ontario, Canada
Filed Jan. 6, 1964, Ser. No. 335,915
Claims priority, application Canada, Feb. 19, 1963, 869,132
6 Claims. (Cl. 24—123)

This invention relates to hooks of the choker type which are employed principally in the logging industry for hitching chokers to a tow line.

The object of the present invention is to provide an improved construction of choker hook that combines ease of manual application and removal, with the avoidance of accidental disengagement. This object is achieved in accordance with the present invention by forming the hook with a body having:

(a) elements forming an eye defining a range of axes along which a straight cable loosely reeved therethrough can extend, (b) elements forming a hollow interior, (c) and further elements forming a keyhole opening communicating between said interior and the body exterior, (d) those element portions forming the narrow part of the keyhole opening including surfaces constituting an inwardly facing ferrule seat, (e) said seat defining an axis generally parallel to one of said eye-defined cable axes, (f) and said further elements embracing said interior with the portions thereof forming the wide part of the keyhole opening defining an axis making an angle with the ferrule seat axis such that introduction of a cable end ferrule into the wide part of the keyhold opening with subsequent engagement of the ferrule with said seat requires rotation of the ferrule through said angle, said angle being significantly greater than 90°.

Other objects and advantages of the invention will be apparent from the description which follows.

The preferred form of the invention is illustrated in the accompanying drawings by way of example, the broad scope of the invention being limited, however, only by the appended claims.

In the drawings.

FIGURE 1 is a general view of a number of logs attached by chokers to a tow line;

FIGURE 2 is an enlarged perspective view of a choker hook constructed in accordance with the present invention;

FIGURE 3 is a view of the choker hook of FIGURE 2 in use, showing a first stage in engagement of the hook;

FIGURE 4 is a view similar to FIGURE 3 at a later stage;

FIGURE 5 is another view similar to FIGURES 3 and 4 showing the hook fully engaged;

FIGURE 6 is a further view of the parts in the FIGURE 5 position, with the choker hook shown in cross section;

FIGURE 7 is a section taken on VII—VII in FIGURE 6;

FIGURE 8 is a section taken on VIII—VIII in FIGURE 2; and

Figure 9:
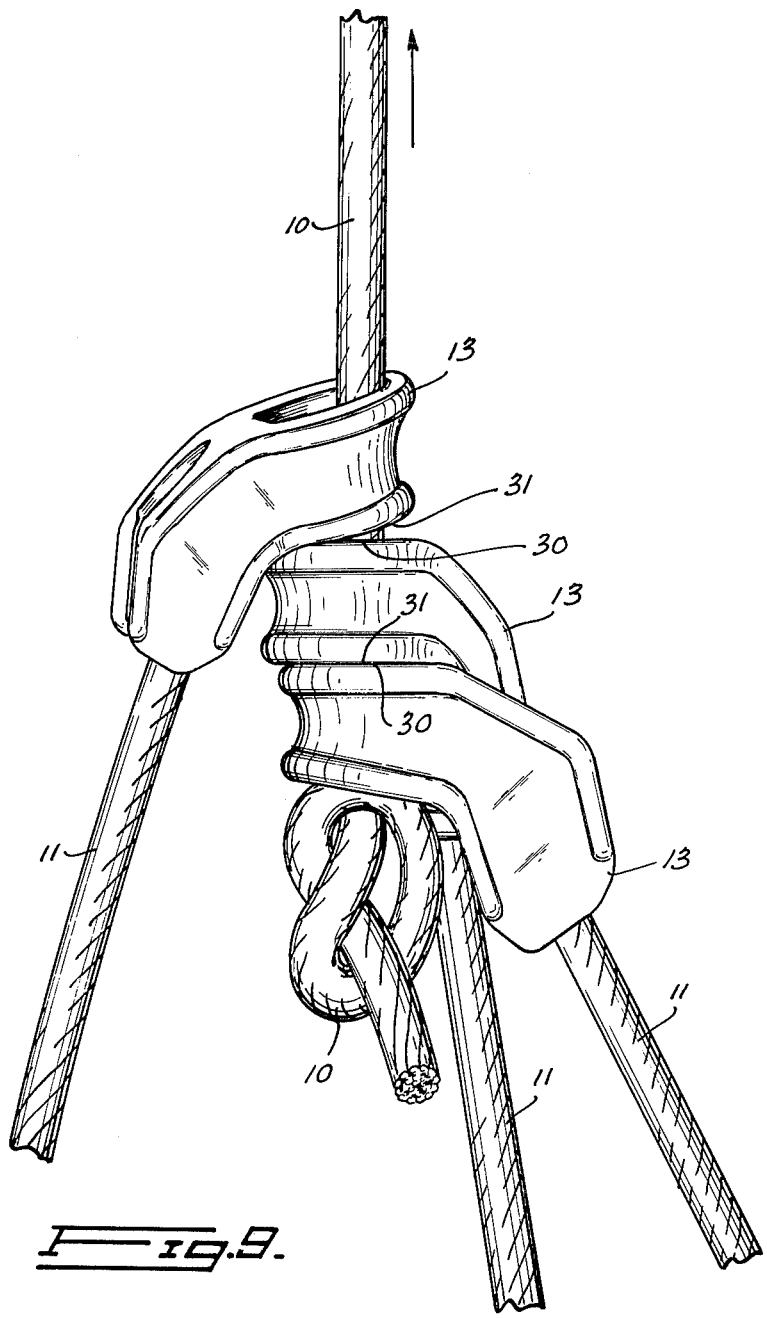
FIGURE 9 is a perspective view of a number of choker hooks on a tow line during towing.

FIGURE 1 shows a winch or tow line 10 which will be drawn along by a tractor or other motive power. To this line 10 there is connected a series of chokers 11 each hitched to a log 12. The chokers 11 are connected to the tow line 10 by choker hooks 13 and further hooks are provided on the ends of the chockers 11 for their connection to the logs 12. These further hooks may be the same as the choker hooks 13 or may be of some other form. The line 10 may have more chockers attached to it than are shown in FIGURE 1, and at its extreme end will be provided with some form of stop to prevent the chokers sliding off the end of the tow line.

It is to be emphasized that FIGURE 1 shows a conventional arrangement and is provided merely as an illustration of one environment in which a choker hook of the present invention has industrial utility. It will be obvious that the hook can have uses in any application where it is desired to hitch one cable to another or to hitch an end of a cable to a length of itself to form a loop around some object to which the cable is to be secured.

The choker hook 13 seen in FIGURE 2 is formed of high tensile strength manganese steel as a body consisting of two spaced, substantially parallel sides 14 interconnected at one end by a curved end element 15 and at the other end by a transverse element 16, the cross-sectional shapes of these portions being best seen from FIGURE 6. A central transverse element 17 bridges the sides 14 intermediate the two ends of the hook and serves to divide the hook into a eye 18 and a hollow interior 19.

The eye 18 receives the tow line 10 which is loosely reeved through it. In the case of a choker hook used to connect a choker 11 to a log 12, it will be the choker cable itself which is reeved through this eye.

The hollow interior 19 formed between transverse elements 16 and 17 as adapted to receive the cylindrical steel ferrule 20 that is conventionally provided on each end of each choker 11. The top surfaces of the sides 14 above the interior 19 define a keyhole opening having a circular wide part 21 leading into a narrow straight part 22 the end of which is defined by transverse element 16. The keyhole opening thus communicates between the interior 19 and the etxerior of the hook body at the top thereof for the purpose of providing access for a ferrule 20. As FIGURE 3 demonstrates, the circular part 21 is of sufficient diameter to receive this ferrule which is inserted when the hook is to be engaged. Having passed the ferrule 20 down into the interior 19 of the hook body, in which interior 19 the ferrule 20 has room to rotate, the choker cable 11 is rotated in the direction indicated by the arrow in FIGURE 4, sliding down the narrow keyhole part 22 until the parts finally come to rest in the position shown in FIGURES 5, 6 and 7 with the end face 23 of the ferrule 20 bearing against an inwardly facing ferrule seat 24 (see FIGURE 8) defined by transverse element 16 and the edges of the sides 14 forming the narrow keyhole part 22.

This is the operative position of the choker hook when engaged and it will be observed that the ferrule 20 is locked against disengagement except by reversal of the engaging movement just described. No further clockwise motion is possible. By virtue of the angulated form of the keyhole opening, reverse rotation necessarily involves anti-clockwise rotation of the choker cable 11 through an angle greater than 90° and preferably about 120° as demonstrated by the chain dotted lines in FIGURE 6 which show the axis 25 of the wide part 21 of the keyhole opening and the axis 26 of the ferrule seat 24. The chance of this large rotation occurring accidentally while the hook is in use is extremely remote. Even when the choker vable 11 is not in tension, the forces acting on it during normal logging operations would not tend to bring about this rotation through an angle greater than a right angle. On the other hand, when an operator wishes to disengage the hook, it is a relatively easy matter for him to turn the choker cable 11 back to the FIGURE 3 position and withdraw the ferrule 20 from the circular portion 21 of the keyhole opening.

When the choker cable 11 is stressed in tension, there will be no tendency for it to bend near the ferrule 20. The hook will tend to turn clockwise on the tow cable 10, which is equivalent to the latter turning anti-clockwise, so that the parts assume the relative positions shown in broken lines in FIGURE 6, the cable axis 27 then being nearly parallel with the ferrule seat axis 26. The restraint applied by the ferrule seat 24 of the hook 13 against the end face 23 of the ferrule 20 is then generally parallel with the direction of pull in the cable 11, with the result that no undesirable kinking or bending of the cable is induced. Alternatively, when desired, the cable 10 can rotate clockwise in the eye 18 until it extends generally transversely of the cable 11, as is desirable when the hook is used at the end of a choker cable 11 adjacent a log 12.

A further feature of the invention is the ease with which two or more hooks will nest together on a tow line. FIGURE 9 shows three hooks 13 drawn down into nesting relationship on tow line 10 by tension in the chokers 11. This ability of the hooks to nest is due to the angular construction of the hooks and the flat, comparatively parallel planes defined by upper and lower surfaces 30 and 31 of the body elements surrounding the eye 18. The nesting ability is exhibited within a wide range of relative angular positions of the hooks, and advantage can therefore be taken of it regardless of the directions in which the chokers 11 pull away from the tow line 10. FIGURE 9 also serves to demonstrate the manner in which the angular construction of each hook permits the chokers 11 to extend directly from the hooks 13, without the sharp kinks that are found to occur in chokers used with prior forms of choker hooks, especially when the hooks become bunched together on a tow line, which is the normal condition during towing. Constant bending of the choker cables, especially the formation of sharp bends in these cables, causes undue wear both to the cable and the hook and shortens the life of both parts. This disadvantage is avoided by the present form of hook.

Although the invention has been specifically described with relation to a choker hook adapted for use in the logging industry, it will be obvious that a hook of this general character may have other uses and, in this respect, the term "choker hook" is used to denote the type of hook rather than any particular use to which the hook is put.

I claim:
1. A hook of the choker type comprising a body having
 (a) elements forming an eye defining a range of axes along which a straight cable loosely reeved therethrough can extend,
 (b) elements forming a hollow interior,
 (c) and further elements forming a keyhole opening communicating between said interior and the body exterior,
 (d) those element portions forming the narrow part of the keyhole opening including surfaces constituting an inwardly facing ferrule seat,
 (e) said seat defining an axis generally parallel to one of said eye-defined cable axes,
 (f) and said further elements embracing said interior with the portions thereof forming the wide part of the keyhole opening defining an axis making an angle with the ferrule seat axis such that introduction of a cable end ferrule into the wide part of the keyhole opening with subsequent engagement of the ferrule with said seat requires rotation of the ferrule through said angle, said angle being significantly greater than 90°.

2. A hook according to claim 1, wherein said range of eye-defined cable axes includes an axis generally transverse to said ferrule seat axis.

3. A hook according to claim 1, wherein said surfaces defining the ferrule seat are so constructed as to lock the ferrule against further rotation in said interior in the direction of the engagement rotation of paragraph (f).

4. A hook according to claim 1, wherein said angle is of the order of 120°.

5. A hook according to claim 1, wherein
 (a) said elements forming the eye define upper and lower generally planar and generally parallel surfaces enabling nesting of a plurality of such hooks on a towing cable,
 (b) the axis defined by said ferrule seat extending sufficiently transversely of the planes of said surfaces that a tensioned cable terminating in a ferrule engaging said seat extends in a manner free of sharp bends in generally parallel relation to a tow cable extending through the eyes of said hooks.

6. A combination of choker hook and cable end ferrule comprising a generally cylindrical cable and ferrule with the end of a cable secured thereto along its axis, said ferrule having a diameter larger than the diameter of said cable end, a one-piece choker hook body formed with an eye portion and a keyhole portion, said keyhole portion being formed with a ferrule seat proportioned to receive and support said ferrule with said ferrule and said cable end extending along a first axis, said keyhole portion including an opening constituting the wide part of the keyhole having a diameter greater than the diameter of said ferrule and proportioned to pass said ferrule when its axis intersects said first axis with an included angle substantially greater than 90°, said keyhole portion being formed with opposed substantially parallel spaced walls extending from said opening to said seat, said opposed walls being spaced a distance greater than the diameter of said cable and less than the diameter of said ferrule permitting passage of said cable end between said seat and opening, said eye portion completely enclosing an opening defining a range of axes along which a straight cable having a diameter at least equal to the diameter of said cable end when loosely reeved therethrough can extend, at least one axis within said range of axes being substantially parallel to said first axis, said eye portion providing planar and generally parallel surfaces permitting nesting of a plurality of similar hooks on a tow cable, the axis defined by said ferrule seat extending sufficiently transversely to the planes of said surfaces so that said cable end when under tension is free of sharp bevels and generally parallel to a tow cable extending through said opening.

References Cited by the Examiner

UNITED STATES PATENTS

| | | |
|---|---|---|
| 1,493,285 | 5/1924 | Scafe. |
| 1,569,021 | 1/1926 | Jorgensen. |
| 1,764,135 | 6/1930 | Young. |
| 2,503,151 | 4/1950 | Ehmann _____ 294—74 |
| 2,637,591 | 5/1953 | Maxfield et al. |
| 2,793,066 | 5/1957 | Rue. |
| 2,872,716 | 2/1959 | Ehmann et al. |
| 3,175,264 | 3/1965 | Maras. |

WILLIAM FELDMAN, *Primary Examiner.*

BOBBY R. GAY, *Examiner.*